(12) United States Patent
Bailey

(10) Patent No.: US 7,103,192 B2
(45) Date of Patent: Sep. 5, 2006

(54) HEARING AID DEVICE ATTACHABLE TO AN EYEGLASSES BOW

(75) Inventor: John Bailey, Crawley (GB)

(73) Assignee: Siemens Audiologische Technik GmbH, Erlangen (DE)

( * ) Notice: Subject to any disclaimer, the term of this patent is extended or adjusted under 35 U.S.C. 154(b) by 0 days.

(21) Appl. No.: 10/943,451

(22) Filed: Sep. 17, 2004

(65) Prior Publication Data

US 2005/0074137 A1    Apr. 7, 2005

(30) Foreign Application Priority Data

Sep. 17, 2003    (DE) ................ 103 43 010

(51) Int. Cl.
*H04R 25/00* (2006.01)

(52) U.S. Cl. .............. 381/327; 381/322; 381/330

(58) Field of Classification Search ............ 381/309, 381/322–324, 327, 328, 330, 380–382; 351/111, 351/123, 156, 158; 2/209; 455/344, 350, 455/351, 346, 349
See application file for complete search history.

(56) References Cited

U.S. PATENT DOCUMENTS

| | | | |
|---|---|---|---|
| 2,999,136 A | 9/1961 | Holt et al. | |
| 3,000,462 A | 9/1961 | Smith | |
| 3,382,327 A | 5/1968 | Bowes | |
| 3,825,700 A | 7/1974 | Jerry et al. | |
| 5,608,808 A * | 3/1997 | da Silva | 381/370 |
| 6,176,576 B1 * | 1/2001 | Green et al. | 351/123 |

FOREIGN PATENT DOCUMENTS

| | | |
|---|---|---|
| DE | 1 724 439 | 6/1956 |
| DE | 83 36 526 | 11/1985 |
| DE | 88 08 620 | 10/1988 |
| DE | 43 33 559 | 4/1995 |
| DE | WO 02/067627 | 8/2002 |

* cited by examiner

*Primary Examiner*—Huyen Le
(74) *Attorney, Agent, or Firm*—Schiff Hardin LLP

(57) ABSTRACT

For making the production of hearing-aid eyeglasses using standard eyeglasses easier, a hearing aid device has a body that can be attached to an eyeglasses bow has a channel therein for acceptance of a flexible eyeglasses bow end piece, and the body is flexible in at least a region thereof. Standard eyeglasses thus do not have to be damaged for connection with the hearing aid device and they can be placed back into their original state in a simple manner.

6 Claims, 2 Drawing Sheets

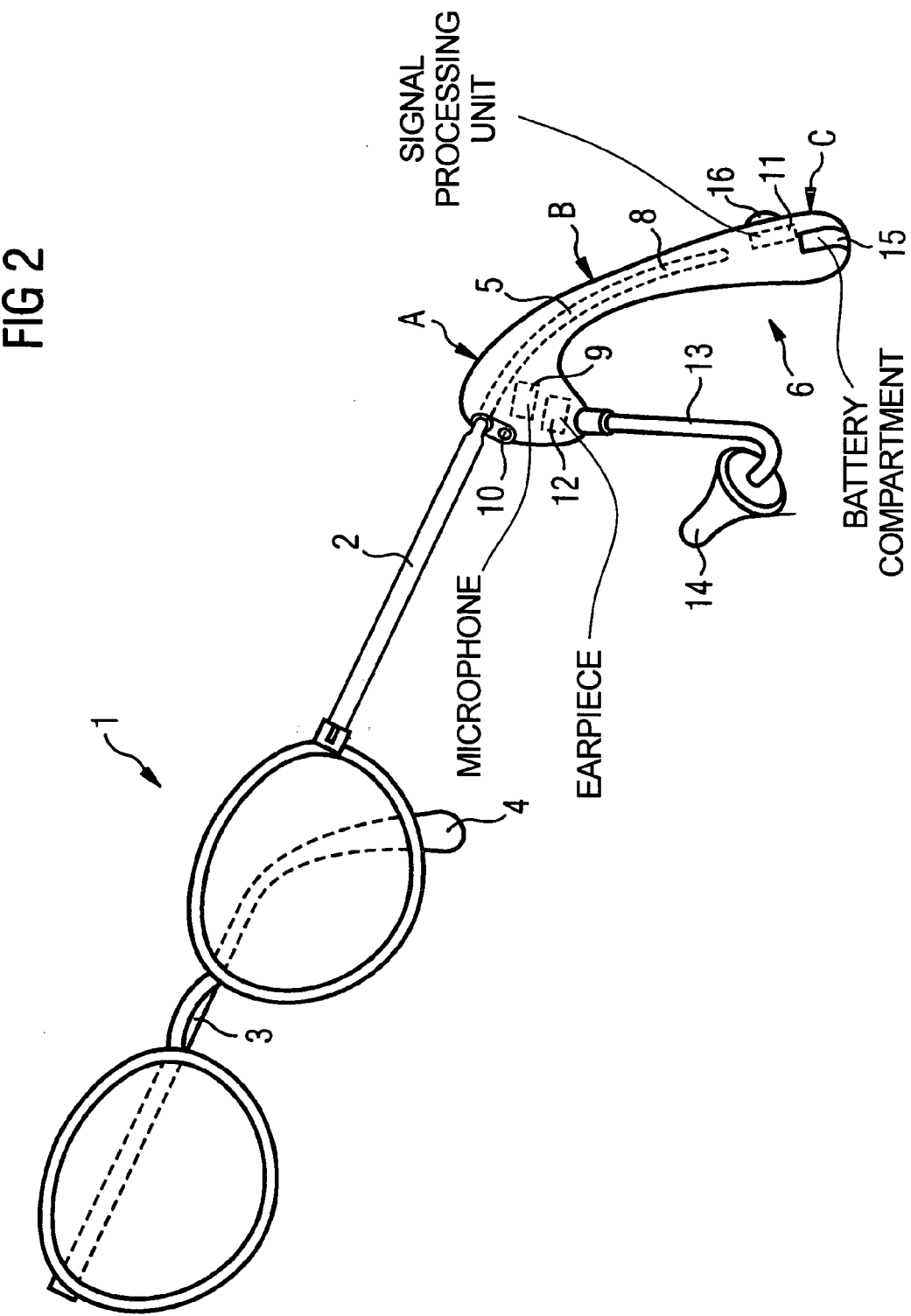

HEARING AID DEVICE ATTACHABLE TO AN EYEGLASSES BOW

BACKGROUND OF THE INVENTION

1. Field of the Invention

The present invention concerns a hearing aid device that can be attached to an eyeglasses earpiece.

2. Description of the Prior Art

Eyeglasses with a bow (earpiece) are known from German Utility Model 83 36 526. The eyeglasses bow typically is fashioned as a metal rod that has a flexible end piece for adaptation to the eyeglasses wearer. The needle-shaped end piece of the bow normally is formed of a metal or a metal alloy. In order to increase the bearing comfort, it is typical to provide a sheath (for example made of silicone rubber) that softly jackets the end piece of the bow that is pushed over the end piece of the bow.

Eyeglasses with a hearing device incorporated therein are known from German Utility Model 87 06 334, wherein the hearing device is divided into at least two units. One of the units is arranged in a connection element that connects a part of a bow that is hinged to the frame with an end piece of this bow that engages behind the ear. The other unit is arranged in this end piece. A disadvantage of such known hearing-aid eyeglasses is that the eyeglasses bow must be shortened for connection with the hearing device, and thus the eyeglasses can be used only in connection with the hearing device (i.e., they are non-standard if only vision correction is needed).

From WO 02/067627 A1, a hearing device is known for installation in a side bow of eyeglasses. The hearing device is provided with an elastically deformable, drawn out, thin pin that is inserted as a core into an ear-side end section of the eyeglasses bow, this pin provides reinforcement and simultaneously enables customized, wearer-dependent adaptation.

SUMMARY OF THE INVENTION

An object of the present invention to provide a hearing aid device that can be fastened on the bow of eyeglasses that allows the glasses still to be worn simply for vision correction after detaching the hearing aid device from the eyeglasses bow.

In a hearing aid device that can be fastened to an eyeglasses bow, this object is achieved by a body of the hearing aid device having a channel therein, passing at least partially through the hearing aid device body, for acceptance of a flexible end piece of an eyeglasses by, and the body being flexible in at least a portion thereof.

Eyeglasses bows are typically formed of a metal or a metal alloy. For adaptation to a particular eyeglasses wearer, the part of each eyeglasses bow located at the ear region (known as the eyeglasses bow end piece) is plastically deformable by bending. The bending for adaptation of the eyeglasses bow normally ensues under heat effect.

In order to increase the wearing comfort as well as for cosmetic reasons, a plastic bearing body is put on the eyeglasses bow end piece. This is elastic and therefore adapts to the curve of the eyeglass earpiece end piece.

With a hearing aid device according to the invention, it is possible to produce hearing-aid eyeglasses from nearly any standard pair of eyeglasses having the described design. For this purpose, only the plastic bearing body must be pulled off the standard eyeglasses bow end piece and the hearing aid device according to the invention is put on the end piece in its place. A hollow bore (channel) for acceptance of the eyeglasses bow end piece is fashioned within the housing of the hearing aid device according to the invention. The eyeglasses bow end piece can be inserted into this channel without having to shorten the eyeglasses bow and thereby damaging the eyeglasses. For individual adaptation to the wearer of the hearing-aid eyeglasses thus formed, the eyeglass earpiece end piece is then curved into shape together with the hearing aid device. The eyeglasses bow end piece thus inserted into the housing of the hearing aid device thus also serves for shaping and reinforcement of the hearing aid device body in addition to fastening the hearing aid device to the eyeglasses. The housing or body of the hearing aid device can be designed from the same plastics that are typically used for production of the eyeglasses plastic bearing body. Plastics that are cold-plastically deformable and also plastically deformable under heating effect (thermoplastic) are possible.

The curvature of the eyeglass bow end piece in the hearing aid device alone normally suffices to durably connect the eyeglasses and the hearing aid device with one another. The hearing aid device and the eyeglasses then can be simply detached from one another again, by the eyeglasses bow end piece and the hearing aid device being bent straight again.

The invention offers the advantage that standard eyeglasses can be used for production of hearing-aid eyeglasses. A large selection of possible eyeglasses in the most varied designs is therefore available for the hearing-aid eyeglasses wearer. Since only the bearing body has to be removed from the eyeglasses for connection with the inventive hearing aid device, the eyeglasses are not damaged and therefore can be put back into their original state again at any time. The hearing-aid eyeglasses wearer is therefore able to try out various eyeglasses models (as occurs for a typical eyeglasses purchase) and can do so even with the hearing aid device connected to the eyeglasses, in view of its removable construction.

As a result of the significantly advanced miniaturization of hearing device components, it is possible to design the hearing aid device according to the invention such that it differs only insignificantly in its external shape from a conventional plastic eyeglasses bearing body. In particular, it exhibits a slender, flexible middle region through which the flexible eyeglasses bow end piece passes. Similar to the opening of a conventional plastic bearing body, an opening in which the eyeglasses bow end piece can be inserted is located in the front region in the inventive hearing aid device. The entire eyeglasses bow end piece preferably comes to be contained within the channel in the body of the hearing aid device. The eyeglasses bow end piece, however, can also be directed and fastened by a number of non-contiguous, relatively short channel sections in the body of the hearing aid device. The fastening can be improved by screw connections, clamp connections, glue connections or other connections of the eyeglasses bow end piece with the hearing aid device.

In a preferred embodiment of the invention the body of the hearing aid device contains all components of a typical hearing aid device worn behind the year. These include at least one microphone for accepting an acoustic input signal and transducing it into an electrical signal, a signal-processing unit for processing and frequency-dependent amplification of the electrical signal, and an earpiece for transducing of the processed electrical signal into an acoustic signal that is emitted into the auditory canal of the hearing-aid eyeglasses wearer. Furthermore, the body of the hearing aid device according to the invention can contain a voltage source fashioned as a battery or accumulator.

A sound tube that is fastened in the ear by means of an otoplastic is provided for sound conduction between the hearing aid device and the ear canal.

The hearing aid device according to the invention can deviate in regions thereof from this preferred embodiment. For example, at least one microphone of the hearing aid device alternatively can be disposed outside of the housing body, for example on the eyeglasses frame. For example, it is also possible for the earpiece is to be disposed outside of the housing body of the hearing aid device. The earpiece thus can be disposed in the otoplastic and connected with hearing aid device only via signal lines.

In a further embodiment, only an end of the housing body is enlarged relative to the slender (flexible) middle region of the housing body. For example, the forward region of the housing body with the channel opening for insertion of the eyeglasses bow end piece can likewise be made very slender, in particular when no further hearing aid device components are accommodated in this region.

DESCRIPTION OF THE DRAWINGS

FIG. 2 shows the eyeglasses according to FIG. 1 with an attached and curved inventive hearing aid device.

DESCRIPTION OF THE PREFERRED EMBODIMENTS

Figure 1:
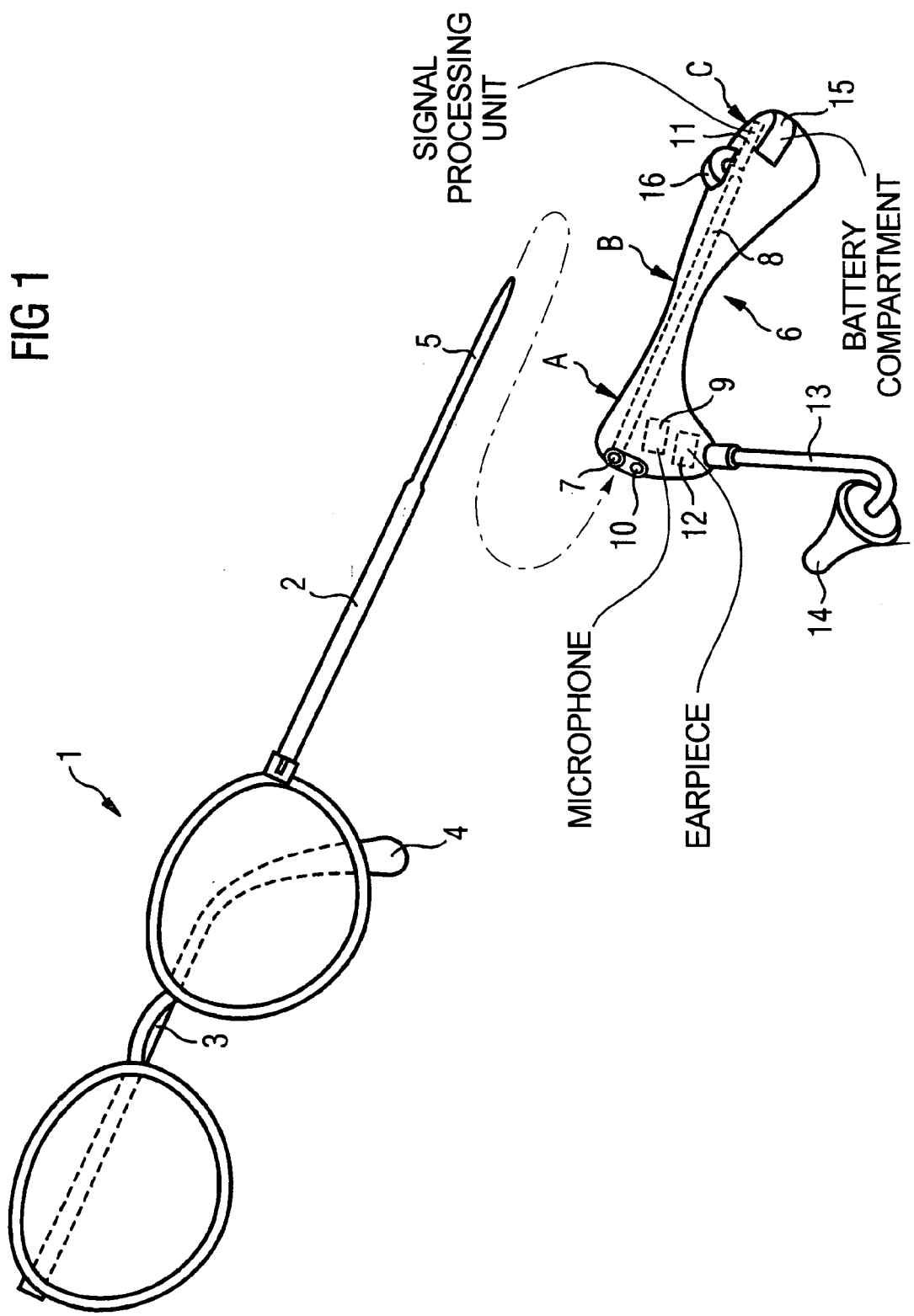
FIG. 1 shows an eyeglasses frame as well as a hearing aid device according to the invention.

FIG. 1 shows typical eyeglasses 1 with a left eyeglasses bow 2 and a right eyeglasses bow 3. In a typical manner, a bearing body 4 made from plastic is placed on the rear end of the right eyeglasses bow 3. The bearing body 4 is curved relative to the front part of the eyeglasses bow 3, such that the right eyeglasses bow 3 engages behind the ear and holds the eyeglasses when worn. In contrast to the right eyeglasses bow 3, the bearing body is removed on the left eyeglasses bow 2, so the metal, flexible eyeglasses bow end piece 5 is visible.

FIG. 1 also shows a hearing aid device 6 according to the invention. The housing body of the hearing aid device 6 has a relatively slender middle region B and a forward region A, enlarged in relation to the middle region B, with a channel opening 7 into which the eyeglasses bow end piece 6 can be pushed to fasten the hearing aid device 6 to the eyeglasses 1. A correspondingly dimensioned channel 8 passes through the body of the hearing aid device 6 for acceptance of the eyeglasses bow end piece 5. Alternatively, the channel 8 could also be formed as a hollow bore within the hearing aid device body and a short channel section close to the eyeglasses bow end piece that serves for direction and fastening of the exemplary embodiment. A type of "channel" is formed anyway on the inside by the long extended and narrow, inner hollow housing of the hearing aid device 6.

The body of the hearing aid device 6 according to the exemplary embodiment furthermore contains a microphone 9 with a sound entrance port 10 for acceptance of an acoustic input signal and transduction into an electrical signal. The processing and frequency-dependent amplification of the electrical signal ensues in a signal-processing unit 11. An earpiece 12 transduces the processed electrical signal back into an acoustic signal that is conducted into the auditory canal of a hearing aid device user via a sound tube 13 and an otoplastic 14. A battery that is located in a battery compartment 15 serves for voltage supply of the hearing aid device 6. Furthermore, the volume can be adjusted or the hearing aid device 6 can be deactivated by actuation of a control know or thumb wheel 6.

At least the middle region B of the body of the hearing aid device 6 is made of a plastic, deformable material, for example silicone rubber, such that the housing can be curved in this region according to the individual requirements of the hearing-aid eyeglasses wearer.

As can be seen from FIG. 1, components (microphone 9, earpiece 12, signal-processing unit 11, battery bay 15) that are significant for the functioning of the hearing aid device 6 are located in the forward region A or in the rear region C of the body of the hearing aid device 6. Therefore only connection lines between the individual hearing aid device components are located in the middle region B in addition to the channel 8, allowing the housing in this region to be made appropriately slender relative to the enlarged forward region A and the enlarged rear region C.

FIG. 2 shows the eyeglasses 1 according to FIG. 1 with the body of the hearing aid device 6 fastened thereon. Designation and functioning of the individual components correspond to the designation and functioning according to FIG. 1. In contrast to FIG. 1, the housing body of the hearing aid device 6 now does not exhibit the long, substantially straight shape as in FIG. 1, but rather the housing is curved in particular in the middle region B, such that the body of the hearing aid device 6 on the left eyeglasses bow 2 assumes the same function (holding the eyeglasses) as the bearing body 4 on the right eyeglasses bow 3. The arrangement of the components in the body of the hearing aid device 6 as illustrated in FIGS. 1 and 2 has the advantage that the middle region B can even be heated to bend the eyeglasses bow end piece. The eyeglasses bow end piece located within the housing body, which durably retains the hearing aid device 6 after the deformation of its shape (or, if applicable, until a new adaptation), also contributes to allowing this.

The invention offers the advantage that typical eyeglasses 1 that are not damaged by the conversion to hearing aid eyeglasses can be used for production of hearing-aid eyeglasses. The hearing-aid eyeglasses wearer therefore has the possibility of trying out various eyeglasses and to place the standard eyeglasses 1 back into their original state (with bearing bodies on both of the eyeglasses bow end pieces) after the detachment of the hearing aid device 6.

The hearing-aid eyeglasses according to the invention are not limited to the shown design. Many variations are conceivable in the scope of the invention, both in the eyeglasses and in the hearing aid device. Naturally the hearing-aid eyeglasses can also be equipped with two hearing aid devices according to the invention (on each on the left and right eyeglasses bows) for binaural hearing assistance.

Other modifications and changes may be suggested by those skilled in the art, it is the intention of the inventor to embody within the patent warranted hereon all changes and modifications as reasonably and properly come within the scope of his contribution to the art.

I claim as my invention:

1. A hearing aid device comprising:
   a housing body having a flexible body region and having a channel completely contained therein, said channel terminating inside said flexible body and having a single opening at an exterior of said flexible body configured to removably receive a terminal portion of an eyeglasses bow end piece that is adapted to fit behind an ear of an eyeglasses wearer;

said flexible region being a middle region of said housing body, and said housing body comprising enlarged end regions respectively disposed at opposite sides of said middle region, said middle region being slender compared to said end regions, and one of said end regions having said opening for said channel therein; and a microphone contained in said housing body in said enlarged end region having said opening for said channel therein.

2. A hearing aid device as claimed in claim 1 comprising an earpiece for emitting an acoustic output signal disposed in said enlarged end region having said opening for said channel therein.

3. A hearing aid device as claimed in claim 1 wherein at least said middle region of said housing body is formed of a thermoplastic plastic.

4. A hearing aid device comprising:

a housing body having a flexible body region and having a channel completely contained therein, said channel terminating inside said flexible body and having a single opening at an exterior of said flexible body configured to removably receive a terminal portion of an eyeglasses bow end piece that is adapted to fit behind an ear of an eyeglasses wearer;

said flexible region being a middle region of said housing body, and said housing body comprising enlarged end regions respectively disposed at opposite sides of said middle region, said middle region being slender compared to said end regions, and one of said end regions having said opening for said channel therein; and said enlarged end region having said opening therein is being a forward region of said housing body, and the other end of said enlarged end regions is a rear region of said housing body; and a voltage source disposed in said rear region.

5. A hearing aid device as claimed in claim 4 comprising an earpiece for emitting an acoustic output signal disposed in said enlarged end region having said opening for said channel therein.

6. A hearing aid device as claimed in claim 4 wherein at least said middle region of said housing body is formed of a thermoplastic plastic.

* * * * *